United States Patent [19]
Maddalozzo, Jr. et al.

[11] Patent Number: 5,878,218
[45] Date of Patent: Mar. 2, 1999

[54] METHOD AND SYSTEM FOR CREATING AND UTILIZING COMMON CACHES FOR INTERNETWORKS

[75] Inventors: John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 819,185

[22] Filed: Mar. 17, 1997

[51] Int. Cl.⁶ .................................................. G06F 13/00
[52] U.S. Cl. .............................. 395/200.43; 395/200.44; 395/200.46; 707/10
[58] Field of Search ........................ 395/200.43, 200.44, 395/200.45, 200.46, 200.47, 200.48, 200.49, 200.53, 200.56; 707/8, 9, 10, 201, 203; 711/147, 153, 141

[56] References Cited

U.S. PATENT DOCUMENTS

| | | | |
|---|---|---|---|
| 4,714,992 | 12/1987 | Gladney et al. | 707/206 |
| 5,204,947 | 4/1993 | Bernstein et al. | 345/357 |
| 5,297,249 | 3/1994 | Bernstein et al. | 346/356 |
| 5,438,508 | 8/1995 | Wyman | 705/8 |
| 5,442,771 | 8/1995 | Filepp et al. | 395/200.49 |
| 5,491,820 | 2/1996 | Belove et al. | 707/3 |
| 5,511,160 | 4/1996 | Robson | 345/501 |
| 5,568,181 | 10/1996 | Greenwood et al. | 348/7 |
| 5,572,643 | 11/1996 | Judson | 395/200.48 |
| 5,583,994 | 12/1996 | Rangan | 395/200.49 |
| 5,671,391 | 9/1997 | Knotts | 711/143 |
| 5,721,914 | 2/1998 | DeVries | 707/104 |
| 5,740,370 | 4/1998 | Battersby et al. | 395/200.49 |

*Primary Examiner*—Parshotam S. Lall
*Assistant Examiner*—Viet Vu
*Attorney, Agent, or Firm*—Richard A. Henkler; Jack V. Musgrove; Andrew J. Dillon

[57] ABSTRACT

An improved method and system for accessing the most recent version of a requested data file that has been downloaded into a private network from a source external to the private network. The objects of the method and system are achieved as is now described. A network of computers is defined as private relative to one or more other networks of computers. More than one computer within said defined private network is specified as composing a "common cache." A copy of any data file entering the defined private network from a source external to the defined private network is cached at one or more computers which compose the defined "common cache." In response to a request from a computer within the defined private network for a specific data file which originates from a source external to the defined private network, a determination is made as to whether a copy of the requested specific data file is resident within the defined "common cache." The most recent version of the requested specific data file which is resident within said defined "common cache" is obtained if it was determined that a copy of the requested specific data file is resident within the defined "common cache." The requested specific data file is obtained from a source external to the defined private network if it was determined that a copy of the requested specific data file is not resident within the defined "common cache."

35 Claims, 10 Drawing Sheets

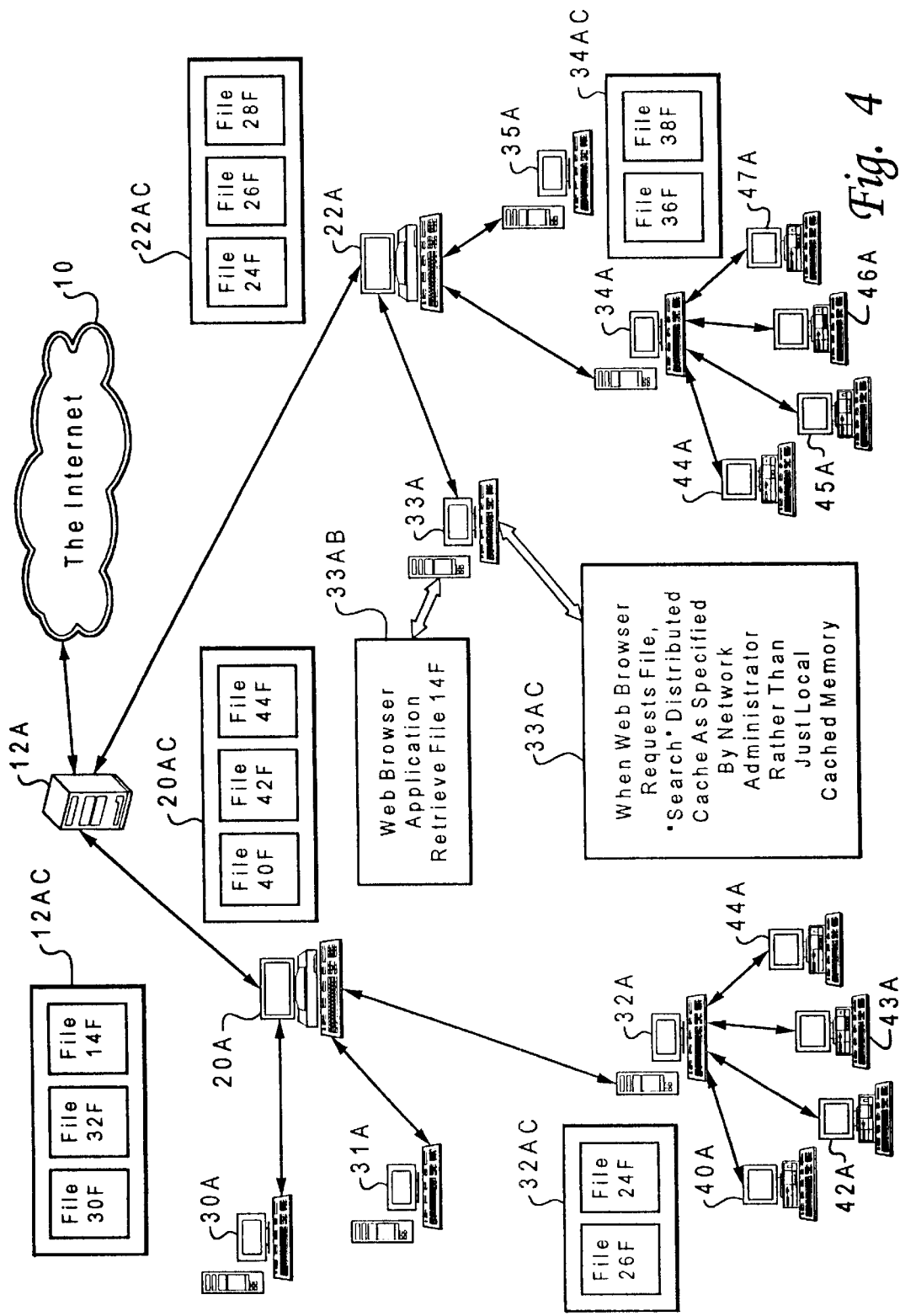

METHOD AND SYSTEM FOR CREATING AND UTILIZING COMMON CACHES FOR INTERNETWORKS

BACKGROUND

1. Technical Field

The present invention relates, in general, to an improved method and system for accessing the most recent version of a requested data file that has been downloaded into a private network from a source external to the private network. In particular, the present invention relates to an improved method and system for accessing the most recent version of a requested data file that has been downloaded into a private network from a source external to the private network by utilizing a "common cache" which is implemented within a collection of hierarchically distributed computers within the private network.

2. Description of Related Art

The present invention is directed toward the improvement of the efficiency of prior art methods and systems used with internetworks. An internetwork is an informal collection of packet-switching networks that is (a) interconnected by gateways, (b) uses protocols allowing it to function as a single, large, virtual network, (c) consists of an interconnection of individual personal computers and computer networks each of which belongs to a public or private entity, such as a person, corporation, university, government agency, or laboratory, and (d) uses existing telecommunications facilities to establish interconnections. M. Weik, *Communications Standard Dictionary* 475 (3rd ed. 1996).

The most well known internetwork is the public network merely referred to as "the Internet." The Internet is the formal collection of networks and gateways that (1) includes among others, the military network (MILNET), and the National Science Foundation network (NSFNET); (2) uses the Transmission Control Protocol/Internet Protocol (TCP/IP) protocol suite; (3) functions as a single, virtual network; and (4) provides global connectivity. Id at 474. Since its inception, the Internet has continued to grow rapidly. In early 1995, access was available in 180 countries and there were more than 30 million users. It is expected that 100 million computers will be connected via the public Internet by 2000, and even more via enterprise internets. The technology and the Internet have supported global collaboration among people and organizations, information sharing, network innovations, and rapid business transactions. "Internet," *Microsoft® Encarta® 96 Encyclopedia.* © 1993–1995 Microsoft Corporation. All rights reserved.

The Internet essentially provides a mechanism whereby a packet-switched data communications channel is established through a packet-switching network between two machines. The Internet is centrally managed, and only computers which appear within the Domain Name System (DNS) can actually establish a true, non-virtual, connection to the Internet. The DNS is actually an online distributed data base which is run on Internet servers throughout the Internet which map human readable addresses into Internet Protocol addresses. Computers that connect directly into the Internet are known as "hosts" and carry "domain names" which uniquely identify them as true nodes within the Internet. M. Weik, *Communications Standard Dictionary* 262 (3rd ed. 1996).

Each Internet "host" generally has a number of "client" computers attached to it, and functions as a "server" for those computers with the service provided being Internet access. In communications networks the terms "client" and "server" refer to client-server architecture which is a network-based system that uses client software running on one computer to request a specific service and uses corresponding server software running on a second computer to provide access to a shared resource managed by the second computer. M. Weik, *Communications Standard Dictionary* 137 (3rd ed. 1996). The server then connects to a resource, such as the Internet, which provides the specific service requested. The server thus allows efficient sharing of a resource. Thus, the terms "client" and "server" are context dependent, and a computer that functions as a "client" in one context (such as a computer requesting Internet access) may function as a "server" in another context (such as where that same computer has a number of computers attached to it and functions as a network resource manager for those attached computers). This same relationship can extend indefinitely, with each attached computer capable of functioning both as a "client" or a "server", dependent upon the computers connected to them and the software architecture on the computers.

This hierarchical relationship has been recognized in the DNS, and consequently a human readable DNS name generally has the structure of a sequence of labels separated by periods, with each label generally specifying a computer (although not always, in that sometimes the labels map to drives or files), and with a file extender being appended to the last label, which corresponds to a specific file on the computer being accessed. For example, a human readable DNS might be nic.ddn.mil/somefile, in which nic (Network Information Center) is the name of the host computer connected to the Internet, ddn (Defense Data Network) is the subdomain corresponding to computer connected to the primary domain computer, and mil (MILNET) is the primary domain corresponding to a computer connected to the host computer, and somefile is a file residing on ddn. M. Weik, *Communications Standard Dictionary* 262 (3rd ed. 1996). Furthermore, each of these domains and subdomains could merely be drives or files as discussed.

Use of the DNS allows computer to computer connection, but once so connected how are the machines to understand each other? In order to understand each other, the machines on either side of the connection must "speak the same language." Toward this end application programs were developed which ran upon the computers communicating over the Internet which allowed the computers on either end of the channel to understand each other. For example, an application called "Gopher" allows users to create and use computer file directories. This service is linked across the Internet to allow other users to browse files. Another application program called File Transfer Protocol (FTP) allows users to transfer computer files easily between host computers. This is still the primary use of the Internet, especially for software distribution, and many public distribution sites exist. The Telnet application allows users to log in to another computer from a remote location. However, all of these preceding referenced protocols generally are meant to connect two computers and allow them to communicate. "Internet," *Microsoft® Encarta® 96 Encyclopedia.* © 1993–1995 Microsoft Corporation. All rights reserved. In 1989 applications to connect computers took a quantum leap forward.

In 1989 the World Wide Web (WWW) was developed by English computer scientist Timothy Berners-Lee to enable information to be shared among internationally dispersed teams of researchers at the European Organization for Nuclear Research (CERN) facility near Geneva, Switzerland. Although the name World Wide Web would seem to indicate that the WWW is a network, it is not. The WWW is actually an application program which runs on individual computers and that creates connections to multiple different source computers over one or more networks. All WWW computer files are formatted using Hypertext Markup Language (HTML), and WWW communication among computers occurs using the Hypertext Transfer Protocol (HTTP). A computer file formatted in HTML is called a "web page" in WWW parlance.

In WWW parlance, connections established between different computers are termed "links." Users interact with computers running WWW software by utilizing application programs known as a WWW browser (e.g. Netscape Navigator). A WWW browser program allows a file formatted in HTML/HTTP format (i.e. "web pages") to be displayed on a computer screen as an agglomeration of text, images, sound, or other visual objects, which can appear as highlighted texts or graphics, and which are in actuality subprograms to establish communications links with other machines internetworked and running WWW software. The user can navigate through information by using a mouse and pointing and clicking on such visual objects on the screen, which will establish a link with another computer over the network and retrieve and display a file formatted in HTML by using the HTTP protocol. Thus, the innovation of the WWW was that the creation of HTML/HTTP formatted files allowed the display of information on a computer screen "as if" it were resident on one computer, while in actuality the information may be distributed in many different files on many different computers. It is important to remember that the HTTP/HTML scheme only refers to making internetworked computers speak the same language, and that actual network communication normally occurs over the Internet or other networks using standard network protocols, such as TCP/IP, or OSI protocols.

Thus, in order to effectively utilize the Internet one needs to both establish a connection over the Internet, and to specify a protocol whereby the computers know how to communicate. In accessing Internet services this is accomplished by use of what is known as the universal resource locator (URL). The URL has two basic components, the protocol to be used, and the object pathname. For example, the URL "http://www.uspto.gov" (home page for the U.S. Patent & Trademark Office) specifies a hypertext transfer protocol (HTTP) and a pathname of the server ("www.uspto.gov"). The server name is associated with a unique numeric value (TCP/IP address).

The foregoing concepts can be made more clear by reference to FIG. 1 which depicts a high-level schematic view of a private network interfacing with an external network. FIG. 1 is also a schematic diagram of how networked computers can connect through hosts to the Internet and then communicate to other computers through the Internet. The Internet 10 is shown as a network cloud. Internet host 12 is depicted as a mainframe computer. Internet host 12 functions as a network server for the network composed of client computers 20–22. Computer 20 functions as network server for the network composed of client computers 30–32. Computer 22 functions as network server for the network composed of client computers 33–35. Computer 31 functions as network server for the network composed of client computers 40–43. Computer 34 functions as network server for the network composed of computers 44–47. Computer 50 functions as a network server for the network composed of client computers 61–64. Computer 46 functions as a gateway between network servers 34 and 50. Furthermore, each network server just referenced functions as a gateway from its lower attached network into the network above it.

Internet host 12A is depicted as a mainframe computer. Internet host 12A functions as a network server for the network composed of client computers 20A–22A. Computer 20A functions as network server for the network composed of client computers 30A–32A. Computer 22A functions as network server for the network composed of client computers 33A–35A. Computer 32A functions as network server for the network composed of client computers 40A–43A. Computer 34A functions as network server for the network composed of computers 44A–47A. Furthermore, each network server just referenced functions as a gateway from its lower attached network into the network above it.

FIG. 1 can be used to illustrate the concepts discussed above. Assume personal computer 40A is running a web browser application program. Suppose that a personal computer 40A's user wants to access a "web page" (computer file formatted in Hypertext Markup Language (HTML)) via a "link" that appears in highlighted fashion on the personal computer 40A's screen. When personal computer 40A's user activates the "link" assume personal computer 40A specifies via a URL that the "web page" corresponding to the displayed "link" actually corresponds to a data file resident on computer 62 Thus, in order to access the desired "web page," personal computer 40A must use its private network protocol to negotiate with its server 32A and indicate that it desires delivery of information to Internet host computer 12A. Server 32A must then serve as a gateway and communicate to its network server 20A and negotiate with server 20A to pass personal computer 40A's information to Internet host 12A. Server 20A must then establish communication with Internet host 12A and then pass personal computer 20A's information to Internet host 12A.

Once Internet host 12A receives the URL from personal computer 20A, it must translate the human readable URL into Internet Protocol format, and then establish a connection with a second Internet host 12 and send the information. Internet host 12 then negotiates with network server 22 and subsequently passes the information. Network server 22 negotiates with network server 34 and subsequently passes the information. Network server 34 negotiates with network gateway 46 and subsequently passes the information. Network gateway 46 negotiates with network server 50 and subsequently passes the information. And network server 50 negotiates with a personal computer 62, and delivers the information to same. Once personal computer 62 has received the information, it recognizes it as a request for a specific HTML file resident within it, retrieves that file, and returns the requested HTML file ("web page") to requesting computer 40A throughout the network in a fashion similar to the one in which the request for the file was sent.

Each time that the networked computers communicated in the above scenario, the computers first had to establish communications links between themselves and pass the information. Each time the information was passed, the information had appended to it headers and trailers to ensure that it arrived at the correct location. Stallings W., *Data and Comiuter Communications* 245–278 (1985). Each communication requires both communications channel bandwidth consumption and computer processing overhead.

Although the above scenario only addresses one computer-computer communication, with WWW software many such connections are envisioned to be occurring simultaneously. Such simultaneous activity consumes considerable communications channel bandwidth and processing capacity.

The problems arising from such redundant data links have been recognized previously. In order to reduce the redundant links and unnecessary Internet work traffic, the previous solution has been to create local data caches on end client user machines, data caches on internetwork gateways, and data caches on the Internet hosts.

FIG. 2 illustrates the major components used to enact the previous solution. Shown is Internet host 12A to which are attached a first network with network server 20A and network members 30A–32A. Also shown attached to Internet host 12A is a second network with network server 22A and network members 33A–35A. In the previous solution, Internet host 12A creates an Internet host cache 12AC of Internet files which are frequently downloaded through it from the Internet. In addition, network server 22A also creates a cache 22AC of Internet files which are frequently downloaded through it. Furthermore, the application program, such as a web browser 33AB, which for sake of illustration is shown running on client computer 33A also creates a local cache 33AC of Internet files which the web browser has recently accessed.

In operation, a user (not shown) of the web browser application 33AB running on client computer 33A requests access to a specific data file 10F. The web browser first checks its local cache 33AC for the requested specific data file. If web browser 33AB finds such file is resident it retrieves the cached file and utilizes it in the manner requested by user (not shown). If the web browser 33AB either finds no such specific data file 10F resident in local cache 33AC (as is the case shown in FIG. 2) or finds such resident file is too old to be reliable, web browser 33AB requests specific data file 10F from Internet host 12A through network server 22A, which in this instance functions as a network gateway.

If the requested specific data file 10F is resident in Internet host local cache 12AC, then Internet host delivers a copy of the cached file to web browser 33AB through network server 22A, which in this instance functions as a network gateway. If the Internet host 12A, either finds no such specific data file 10F resident in Intronet host cache 12AC or finds such resident file is too old to be reliable, Internet host establishes contact with the computer (not shown), via the Internet, wherein specific data file 10F is actually resident and retrieves the file in the fashion discussed above with respect to computer-computer communication via the Internet. Once Internet host 12A receives specific data file 10F it delivers such to web browser 33AB through gateway/network server 22A.

Each time an often requested specific data file transits through a network server/gateway, such as 22A, the network server creates a cached copy such as 22AC of the specific data file. Thereafter, specific data file requests through the network server/gateway 22A are first checked against this cache to determine if the specific data file is resident, much in the fashion described regarding when web browser 33AB requests a specific data file from Internet host 12A.

FIG. 3 shows a problem that exists within this prior art solution. At time t1 a user (not shown) of web browser 33AB requests specific data file 12F. Since specific data file is not resident in local cache 33AC, web browser 33AB then requests specific data file 12F from Internet host 12A. Internet host 12A consults Internet host cache 12AC, finds specific data file $12F_{t1}$ (where the subscript t1 indicates the version of specific data file 12F resident in Internet host case 12AC at time t1) resident and delivers a copy of the cached file to web browser 33AB. At time t1+10 seconds, another web browser 30AB, running on computer 30A, requests the same specific data file 12F, which again is not resident in local cache 30AC from Internet host 12A through network server/gateway 20A. However, upon receipt of this request and at this new time t1+10 seconds, Internet host 12A determines that the cached version of specific data file 12F (that cached version being $12F_{t1}$) is too old and therefore initiates communication, over the Internet, with computer 35 (upon which data file 12F is actually resident) and requests a new copy of file 12F from computer 35. Upon receipt of newly retrieved specific data file $12F_{t1+10}$ (where the subscript t1+10 indicates the version of specific data file received by Internet host 12A from computer 47 in response to the query made at time t1+10), Internet host 12A passes a copy to the file through network server/gateway 20A to web browser 30AB, and then caches the newly retrieved version of specific data file $12F_{t1+10}$. Furthermore, at this point network server/gateway 20A determines that specific data file $12F_{t1+10}$ is oft requested and thus decides to store an image of the file in network server cache 20AC (not shown).

The problem that exists within the prior art solution is now readily apparent. A newer version (specific data file $12F_{t1+10}$) is now locally resident in both Internet host cache 12AC and network serve cache 20AC, but web browser 33AB has in its cache the older version of the file (12F). Since it is very possible, and even likely, that the newly retrieved specific data file $12F_{t1+10}$ contained data different from earlier retrieved specific data file $12F_{t1}$ it is important that when such a newly retrieved specific data file $12F_{t1+10}$ becomes locally resident, such newly retrieved file contents be disseminated throughout the system to all clients who may be interested in such data. However, under the prior art solution this updated information is not supplied to the local caches of web browsers running on client computers.

In light of the foregoing, it is apparent that a need exists for a method and system which efficiently disseminates throughout application programs running on computers within one or more private networks the newest version of a specific file which has been downloaded into the one or more private networks from a source (such as the public Internet or other private networks) external to the one or more private networks.

SUMMARY OF THE INVENTION

It is therefore one object of the present invention to provide an improved method and system for accessing the most recent version of a requested data file that has been downloaded into a private network from a source external to the private network.

It is another object of the present invention to provide an improved method and system for accessing the most recent version of a requested data file that has been downloaded into a private network from a source external to the private network by utilizing a "common cache" which consists of a collection of hierarchically distributed computers within the private network.

The foregoing objects are achieved as is now described. A network of computers is defined as private relative to one or more other networks of computers. More than one computer within said defined private network is specified as composing a "common cache." A copy of any data file entering the defined private network from a source external to the defined private network is cached at one or more computers which compose the defined "common cache." In response to a request from a computer within the defined private network for a specific data file which originates from a source external to the defined private network, a determination is made as to whether a copy of the requested specific data file is resident within the defined "common cache." The most recent version of the requested specific data file which is resident within said defined "common cache" is obtained if it was determined that a copy of the requested specific data file is resident within the defined "common cache." The requested specific data file is obtained from a source external to the defined private network if it was determined that a copy of the requested specific data file is not resident within the defined "common cache."

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 4 depicts a high-level partially schematic view of a system illustrating how the present invention would function on a private network which interfaces with the Internet;

DETAILED DESCRIPTION OF PREFERRED EMBODIMENT

The following discussion uses the term "private networks." As used herein the term is meant to distinguish between the one or more private networks where the present invention will be implemented and other networks external to those one or more private networks such as the public Internet or other public or private networks. As used herein, the term "private" refers to both truly private networks and portions of the Internet over which the system administrator retains some control (e.g. Intranets, which utilize portions of the public Internet but are somewhat screened off therefrom with either hardware or software, such as "firewalls").

Figure 1:
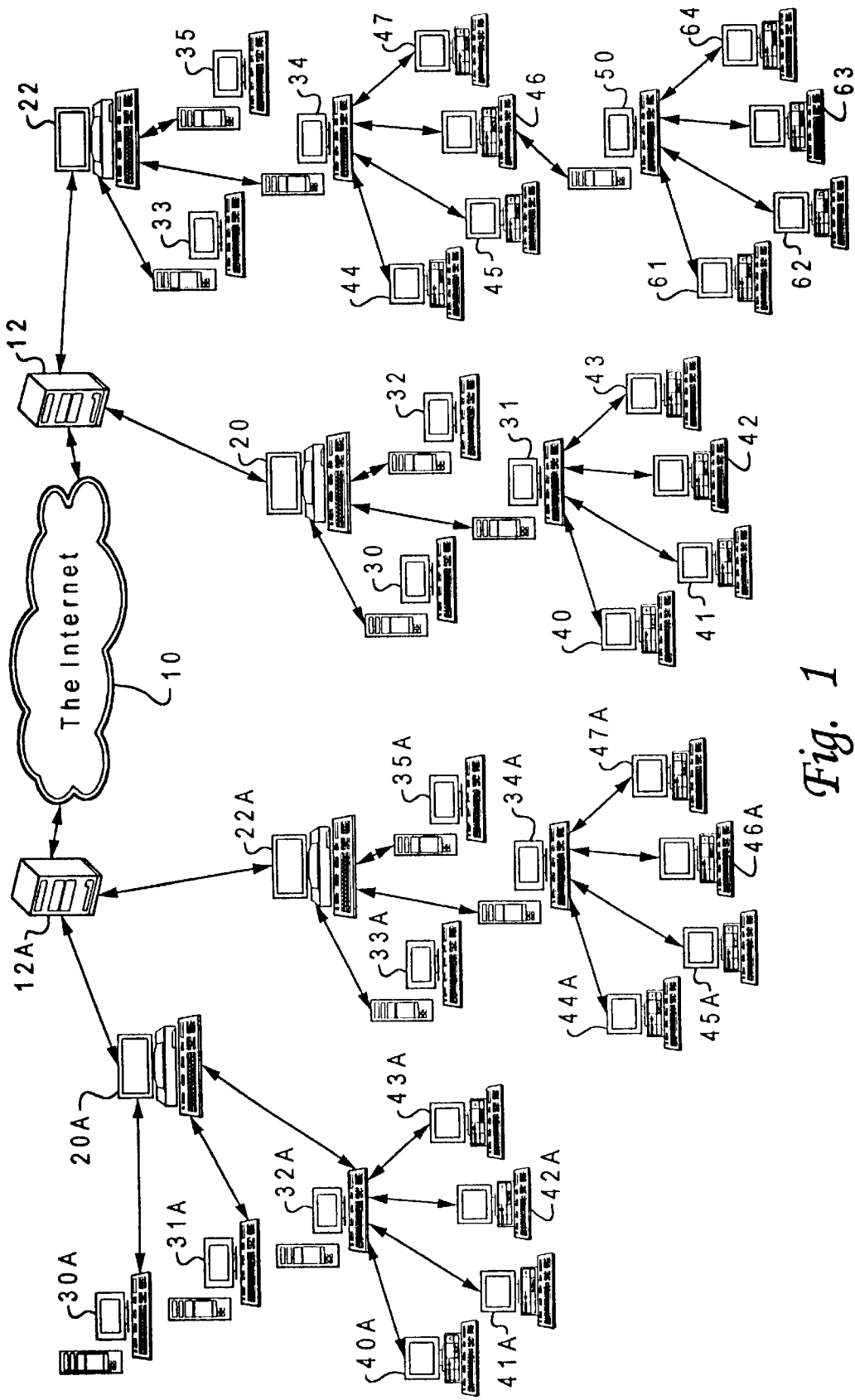
FIG. 1 depicts a high-level schematic view of a private network interfacing with an external network.
Figure 2:
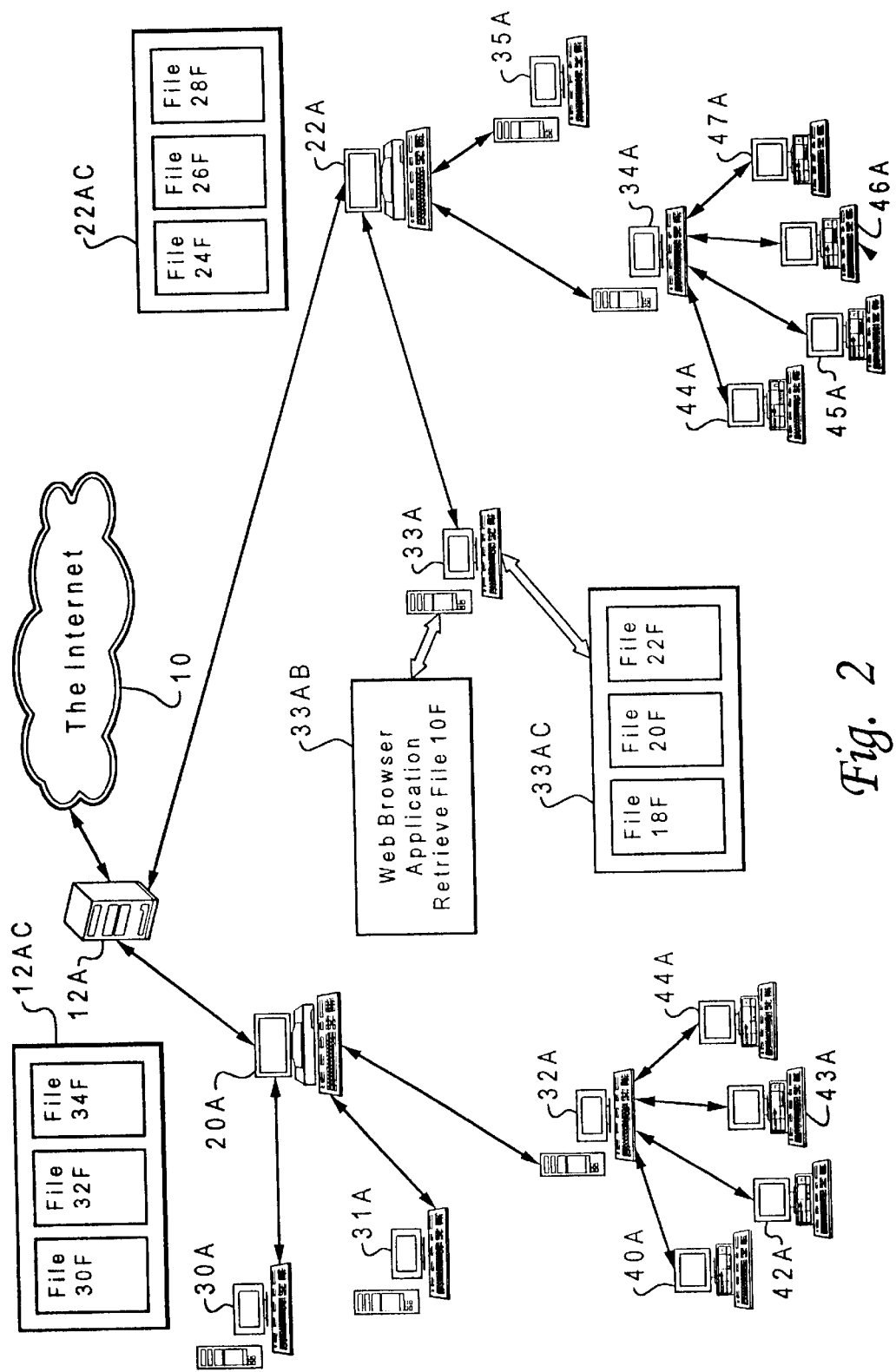
FIG. 2 illustrates the major components used to enact the previous solution.
Figure 3:
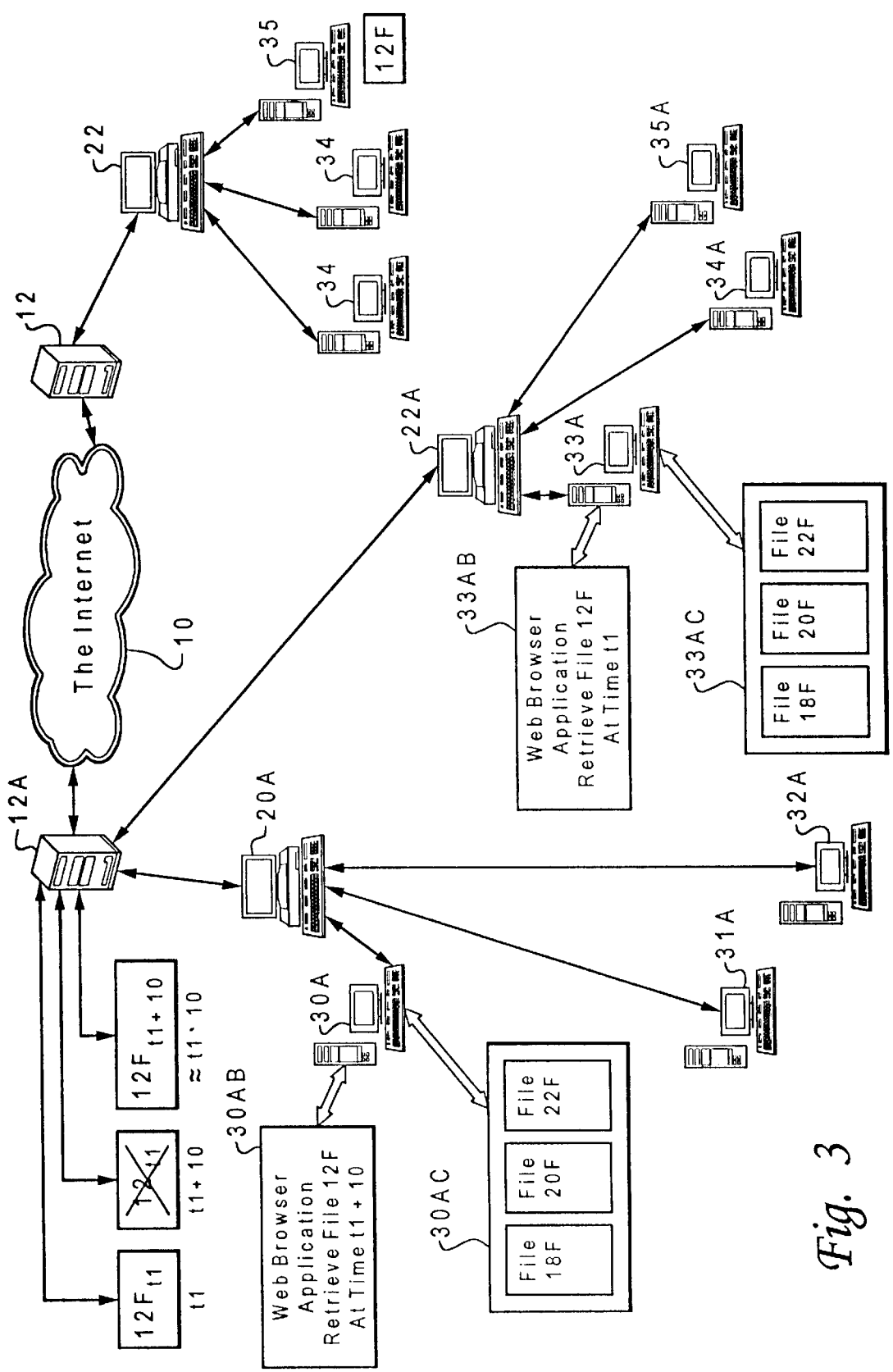
FIG. 3 shows a problem that exists within the prior art solution.

With reference now to the figures and in particular with reference now to FIG. 1, it can be seen that FIG. 1 depicts a high-level schematic view of a private network interfacing with an external network. The problem which the present invention addresses has been discussed previously in relation to FIG. 1. The problem is how to ensure that a local application program, running on a computer far down in the hierarchy of the private network, will be using the most current version of a file that is resident within all or a part of the private network. As will now be discussed, the present invention solves this problem by creating a "common cache" for each private network user which is potentially as large as the private network. Furthermore, it will be recognized by those in the art that the created "common cache" could potentially be as small as one network gateway server, which would be the simplest implementation of the present invention.

Referring now to FIG. 4, there is depicted a high-level partially schematic view of a system illustrating how the present invention would function on a private network which interfaces with the Internet. It will be clear to those in the art that the present invention could just as easily function in relation to a private network which interfaces with another private network external to it, but for sake of illustration, a private network interfacing with the Internet will be described here. Shown is a computer 33A, upon which is running a web browser application 33AB. Also shown is the local cache 33AC, resident in computer 33A's memory, which is created and maintained by web browser application 30AB.

A user (not shown) of web browser application 33AB requests a specific data file 14F. In the prior art, web browser 33AB consults its cached memory and if web browser 33AB finds a cached copy of the file that is not too old, then web browser application 33AB will use the cached copy. If web browser 33AB does not find the copy, then web browser 33AB will request a copy of specific data file 14F from Internet host 12A. This is not the case with the present invention.

The present invention, in effect, creates a cache for the web browser application (which is used only for example, in that the application could just as easily be another application such as FTP, or Gopher) potentially just as large as the one or more privately internetworked networks of which it is a member. It does this by defining one or more of the computers (such computers usually being network servers which also serve as gateways between the sub-networks making up the private network or gateways computer connecting the private network to one or more external networks) within the private network as composing a "common cache." Then, in a manner explained below, when the web browser application 33AB requests specific file 14F, web browser 33AB will consult this "common cache" which will ensure that any version of specific file 14F which web browser 33AB is using is the most current version of the file within the defined "common cache." Since the computers defined to make up the "common cache" could potentially encompass all gateways used by the private network, it follows that the "common cache" could be defined such that it would be sure to contain any version of a data file that has transited a gateway within, into, or out of the private network.

Figure 5A:
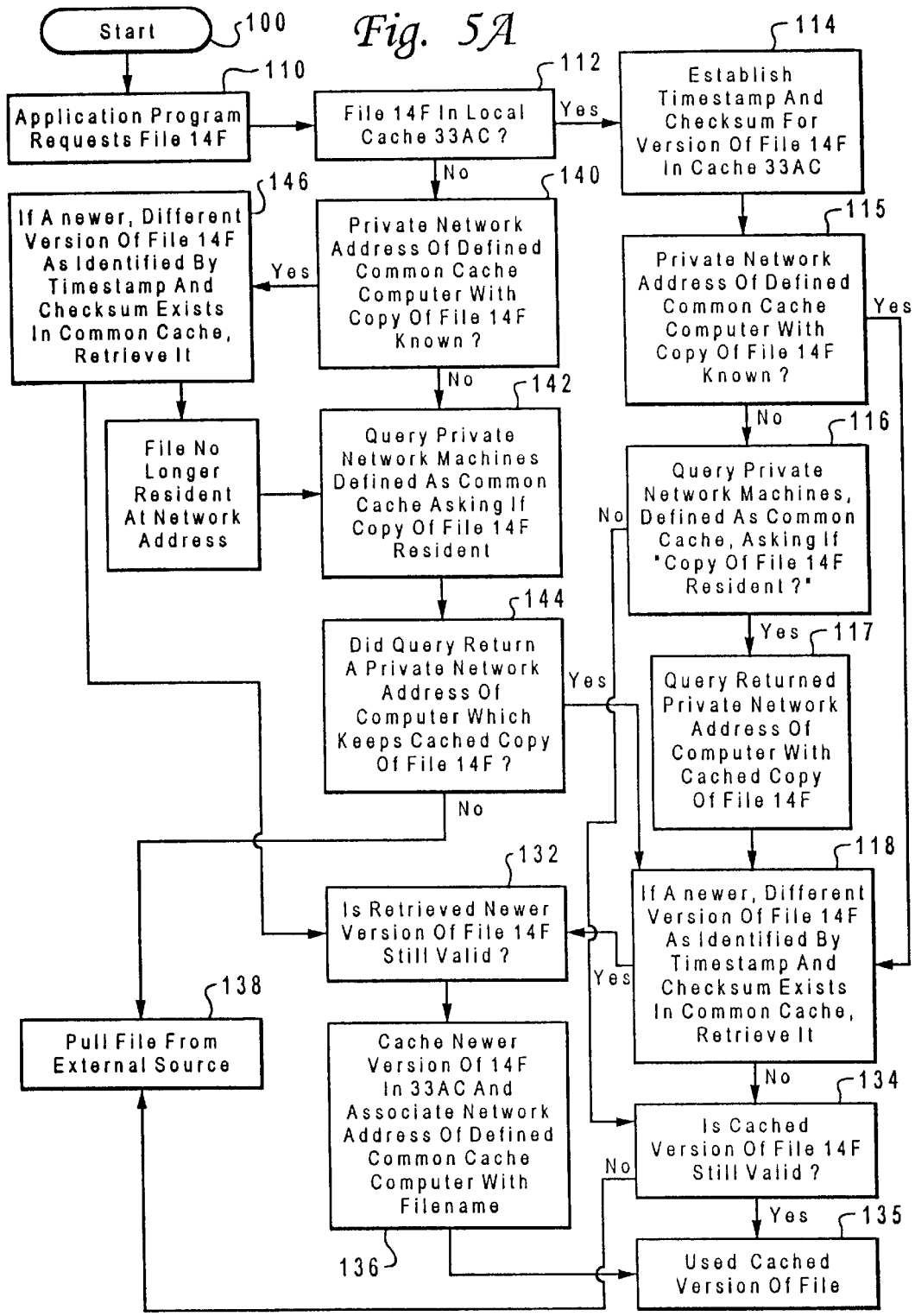
FIGS. 5A, 5B, and 5C are high-level logic flowcharts depicting the method and process of the preferred embodiment of the present invention.
Figure 5B:
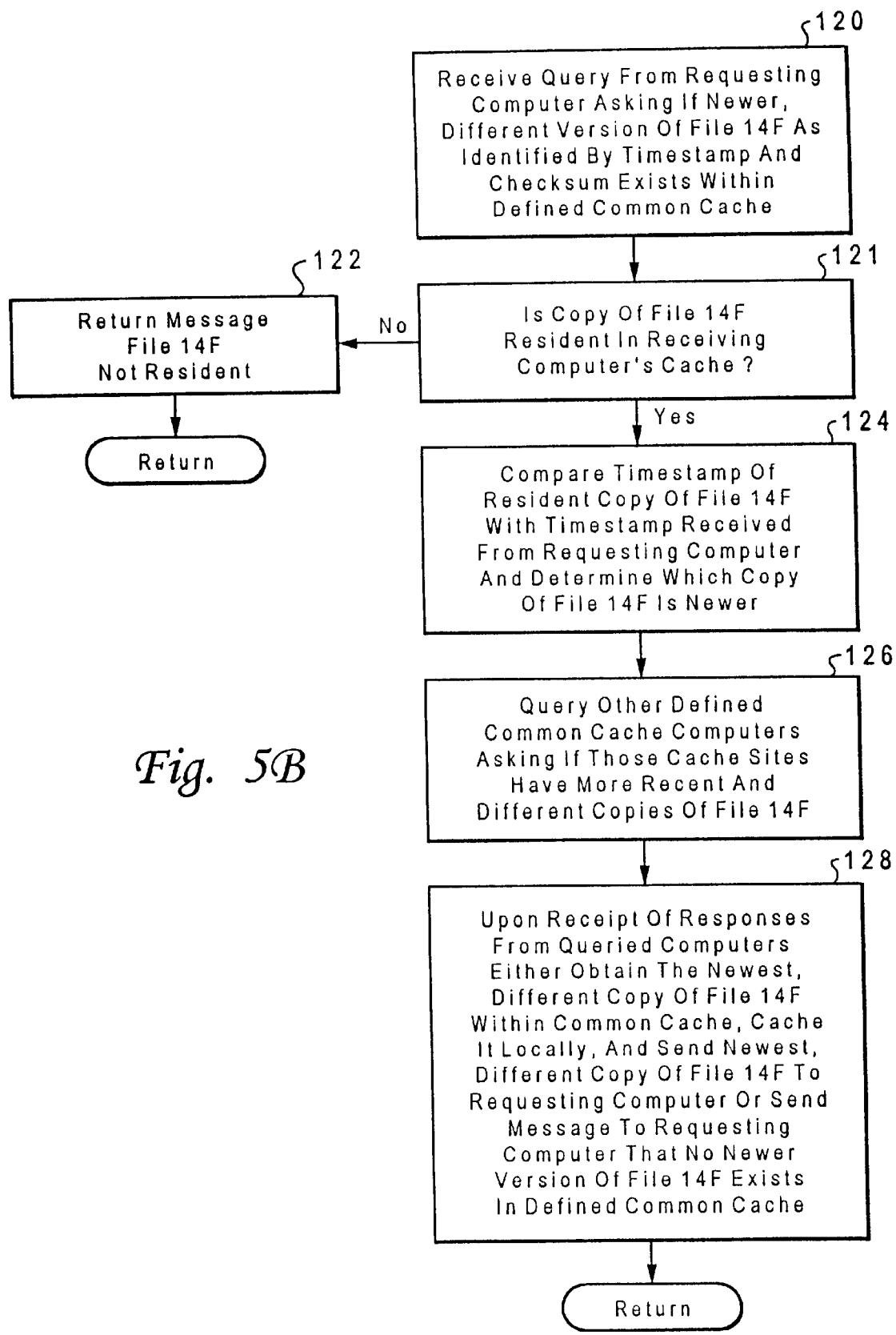
Figure 5C:
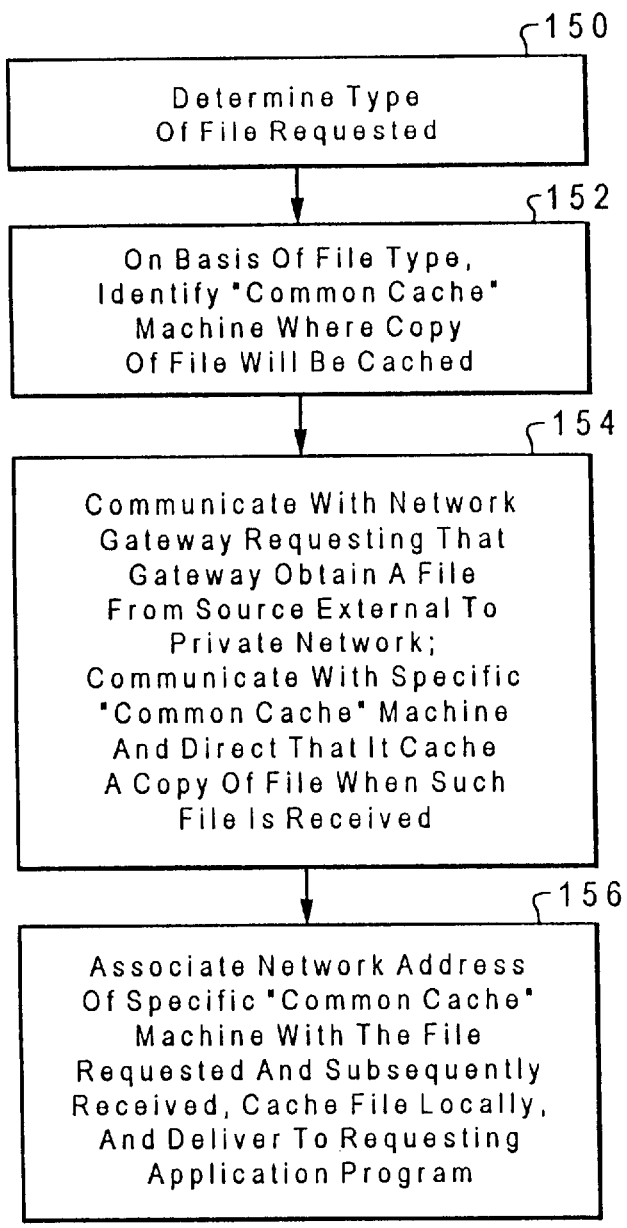

FIGS. 5A, 5B, and 5C are high-level logic flowcharts depicting the method and process of the preferred embodiment of the present invention. The preferred embodiment of the present invention envisions the cooperation of individual client computers and network servers within the one or more private networks. FIG. 5A mainly illustrates the steps which the client computers engage in while executing the method. FIG. 5B mainly depicts the steps that network servers engage in while executing the method. FIG. 5C mainly depicts the steps, split between the individual client computers and network servers, which will be engaged in when a copy of a file is pulled from a source external to the private network.

For sake of illustration, the following discussion of the method and process of the preferred embodiment will make reference to the method and process being carried out on the private network interfacing with the Internet as depicted in FIG. 4. This is being done because the method and process is easier to understand when discussed in this way. It will be understood by those within the art that discussing the method and process in relation to FIG. 4 is merely done for clarity, and that in actuality the method and process discussed is applicable to any network defined to be private in relation to other networks external to it.

With reference to FIGS. 4, 5A, 5B, and 5C, method step 100 shows the start of the process. Method step 110 depicts web browser application program 33AB requesting a specific data file 14F. In response to this request, method step 112 illustrates computer 33AC, upon which web browser application program 33AB is running, first checking local cache 33AC for a copy of file 14F. If a copy of file 14F is not on local cache 33AC, then the method jumps to method step 140. If a copy of file 14F is on local cache 33AC, then method step 114 shows the establishment (verifying and reading) of a timestamp (when the copy was actually generated by a source external to the private network) and checksum (utilized to compare the contents of one file with another) for the copy of file 14F in local cache 33AC. After the timestamp and checksum for the copy of file 14F in local cache 33AC has been established, method step 115 shows that computer 33A checks to see if it (33A) has a private network address of a defined "common cache" computer which is keeping a copy of file 14F. If a private network address is known for file 14F, then the method jumps to method step 118. In the event that no private network address is known for file 14F, method step 116 illustrates that various private network computers, defined by the network administrator to compose the "common cache," are asked if they have a copy of file 14F. The order in which the private data caches are searched is determined by the network administrator, but by way of example suppose that the "common cache" has been defined by the network administrator to be composed of computers 22A, 12A, 20A, and 32A, with network caches 22AC, 12AC, 20AC, and 32AC, respectively. In our example, network server cache 22AC would be searched first, and since no copy of the file exists on network cache 22AC, the search would proceed to Internet host computer 12A, where Internet host cache 12AC is searched. Since, in our example, Internet host cache contains file 14F, the search will stop there, but if it had not such search could have continued throughout the private network in such a fashion and through as many network server/gateways as the system administrator specified (e.g., next search 20AC, then 32AC). As shown in the figure, the search of method step 116 asks if a copy of file 14F is resident on the cache of the computer queried. If a copy is resident on a computer queried, then the private network address of the computer where the copy is resident is returned to querying computer 33A as a location within the defined "common cache" where 14F is cached.

If the search of method step 116 found that there was no private network computer within the defined "common cache" where a copy of file 14F is resident, then the method jumps to method step 134. If the search of method step 116 found that there was a private network cache where a copy of file 14F is resident, then method step 117 shows that computer 33AC associates the private network address of that computer with the "common cache" location of file 14F. Shown in FIG. 4 is a situation such that the search of method step 116 will find computer 12A to have a copy of file 14F, and thus associate the private network address of computer 12A with the "common cache" location of file 14F.

In response to the search results, method step 118 illustrates computer 33A requesting computer 12A to send the newest version of file 14F which is resident within the "common cache" and which is more current than and different from the copy of file 14F in local cache 33AC. Method step 118 accomplishes this by sending the query to computer 12A with the timestamp and checksum for the copy of file 14F in cache 33AC.

At this point control of the process is transferred to the computer corresponding to the private network address of the computer where the file is cached in the defined "common cache" (which in the example being discussed is computer 12A). The functions of method step 118 are illustrated by method steps 120–128 as shown in FIG. 5B. Method step 120 illustrates Internet host computer 12A receiving the filename $14F_{33AC}$ (the subscript 33AC referring to the fact that the timestamp and checksum are associated with the copy of the file in cache 33AC) with its attendant timestamp and checksum. Method step 121 first shows computer 12A consulting cache 12AC to see if a copy of file 14F is still resident therein (in some instances, the private network caches will have overwritten file 14F due to processing constraints, and subsequently the copy of file 14F will no longer be resident). If no copy of file 14F is resident in cache 12AC, then method step 122 shows that a message to that effect is returned to querying computer 33AC. However, if a copy of file 14F is resident in cache 12AC, method step 124 shows the comparison of the timestamp of the copy of file $14F_{12AC}$ (the copy of file 14F in cache 12AC) in local cache 12AC with the timestamp associated with copy of file $14F_{33AC}$. Once this comparison has been done, method step 126 shows that computer 12A sequentially queries the other private network cache sites (the specific computers that may function as the "common cache" being a parameter definable by the network administrator), asking them if they have a copy of file 14F which is more recent and different from the copy of file 14F which the comparison of method step 124 showed to be the most recent. Method step 126 accomplishes this by sending the filename and associated timestamp and checksum for that most recent file to the other private network computers defined to compose the "common cache."

Method step 128 illustrates the receipt by network cache computer 12A of the responses from the other network computers within the private network which were queried in method step 126. If the received query results indicate that newer and different versions of file 14F exist on another "common cache" machines, then method step 128 shows that the newest, different version is retrieved, cached at 12AC, and a copy sent to querying computer 33AC. If no newer and different version of the file exists within the "common cache," then method step 128 indicates that a message to that effect is sent to querying computer 33A. At this point control of the process is transferred back to querying computer 33A.

Method step 132 shows that if method step 118 returned a new version of file 14F, the file is checked against parameters determined by application 33AB to determine if the newer version of file 14F is a valid file. If method step 132 determines the new version of file 14F is not valid, the method jumps to method step 138 and a copy of file 14F is pulled from a source external to the network. If method step 132 determines the new version of file 14F is valid, method step 136 illustrates that the newer version is cached in local cache 33AC, and that the "common cache" copy of file 14F is associated with the "common cache" network address of computer 12A. Method step 135 illustrates the delivery of the locally cached version of file 14F to requesting application program 33AB. If method step 118 did not return a new version of file 14F, method step 134 determines if locally cached older version of file 14F is still valid. If the older version is no longer valid, the method jumps to method step 138 and a copy of file 14F is pulled from a source external to the network. If the older version of file 14F is valid, method step 135 illustrates the delivery of the older locally cached version to application program 33AB.

Method step 140 is engaged in if the inquiry of method step 112 indicated that a copy of file 14F is not in local cache 33AC. Method step 140 asks if there is a "common cache" network address known for file 14F. If there is a "common cache" network address for file 14F, then the method jumps to method step 146. If there is no "common cache" private network address known for file 14F method step 142 illustrates that the "common cache" is searched to determine if a copy of file 14F is resident in any of the caches. Method step 142 is identical in operation to method step 116. Method step 144 shows that if method step 142 returned the message that no copy of file 14F is resident within the defined "common cache," then the method jumps to method step 138 and a copy of file 14F is pulled from a source external to the network. Method step 144 depicts that if there is a "common cache" private network address for file 14F, then the method jumps to method step 118 and the private network cache where a copy of file 14F is resident is queried regarding the most recent version of file 14F.

Method step 146 is identical in operation to method step 118. The functions of method step 146 are illustrated by method steps 120–128 as shown in FIG. 5B. If method step 146 returns the message that file 14F is no longer resident at the private network address, then the process proceeds to method step 142 and proceeds from that point as shown in FIG. 5A and as has been discussed previously. If method step 146 returns an updated file the process proceeds to method step 132 and proceeds from as shown in FIG. 5A and as has been discussed previously.

FIG. 5C illustrates the functions performed by method step 138 which pulls the file from a source external to the private network. Method step 150 depicts that when a file is to be pulled from a source external to the private network, the file type (e.g. image or text files) is determined. On the basis of this determination, method step 152 illustrates that a specific "common cache" private network address is designated as identifying the machine where the "common cache" copy of the file will reside. Method step 154 shows the communication of web browser application 33AB with Internet host 12A requesting a specific file from a computer on the Internet. Method step 154 also illustrates the communication of the identified "common cache" computer telling it to keep a copy of file 14F after Internet host 12A has downloaded that file from the Internet. Method step 156 depicts that upon the receipt of file 14F from Internet host 12A, a private network address is now identified as the "common cache" location of file 14F, and a copy of file 14F is cached locally in 33AC and delivered to web browser application 33AB which requested it. Method step 158 shows the end of the process whereby a copy of the specific data file is pulled from the Internet (a source external to the private network) and cached within the private network.

Figure 6:
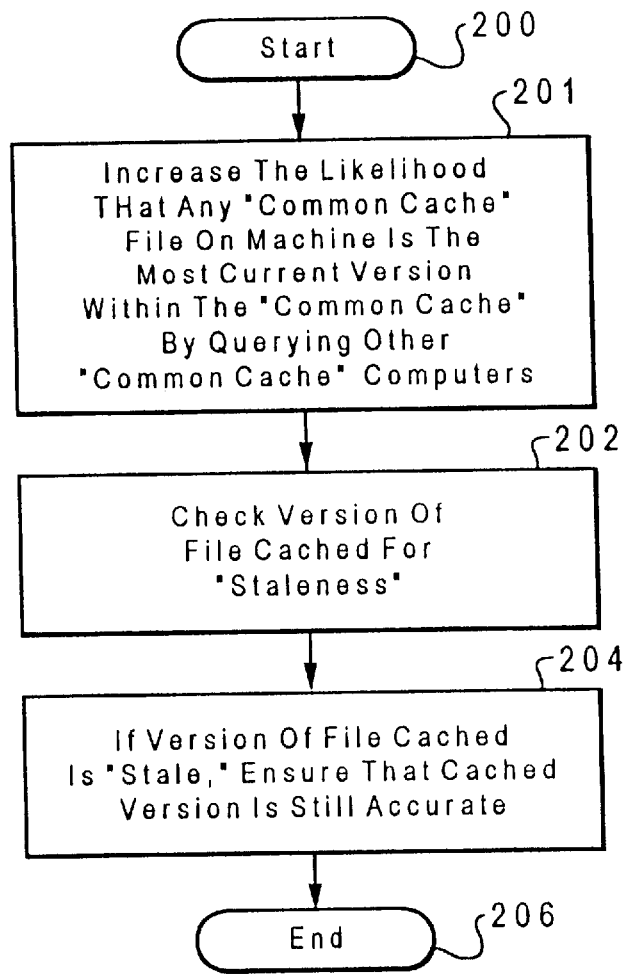
FIG. 6 illustrates an additional feature of the invention wherein each "common cache" computer endeavors to keep the data files on the "common cache" fresh.

The foregoing discussion has explained both how a specific data file receives a "common cache" address and how the most recent version of the file within the "common cache" is obtained. FIG. 6 illustrates an additional feature of the invention wherein each "common cache" computer endeavors to keep the data files on the "common cache" fresh. Once a "common cache" computer has been directed to cache a copy of the file, in one embodiment of the present invention the "common cache" computer tries to keep its file fresh so that any time it is queried for a copy of the most recent version of one of its cached files, it is more likely that the most recent version of the file in the "common cache" is already in its cache (i.e., it does not have to load a more recent copy of the file from elsewhere in the cache). There are two things that must be done to assure this: (1) periodically query other members of the cache for newer, different versions of cached files; and (2) downloading new versions of the files from sources external to the private network when the files within the "common cache" become too stale.

Method step 200 shows the start of the process. As noted the first thing to be done is to increase the likelihood that any cached file at a computer within the "common cache" is the most current version of the file within the "common cache." Method step 201 illustrates this action. There are many ways in which this could be done, but one way would be to have the network server where the specific data file is resident broadcast to other network servers within the defined "common cache" a query as to whether the other network servers have a version of the file which is newer than and different from the version of the file which the network server has resident (in a way analogous to ensuring that the most current version of the file within the "common cache" is returned to a requesting application program computer, as discussed above). If any of the network servers do have such a file, then the requesting network server will obtain a copy of the newer, different version of the file, archive it, and deliver it to requestor. If no other network server has a newer version, then the cached copy of the file at the network server is used.

Once it has been established that the file under consideration is the most current version within the private network, file is checked for "staleness." Method step 202 depicts this action. The criteria upon which such staleness assessment could be made are many, but a few nonexclusive examples would be chronological age of the file, or the number of times the file has been accessed per unit time. If it is determined that the file is stale, it is then important to ensure that the data contained in the file is still accurate. Method step 204 illustrates this action. There are many ways this could be accomplished, but two nonexclusive examples would be establishing a communications link with the actual source computer of the file and obtaining a new copy of the file or querying the source computer to see if the data contained within the cached file is still accurate, and if it is still accurate updating the timestamp to current, and if it is inaccurate obtaining a copy of the more accurate file. Method step 206 shows the ending of the process whereby "common cache" computers increase the likelihood that their cached files are valid and the most current version within the "common cache."

Figure 7:
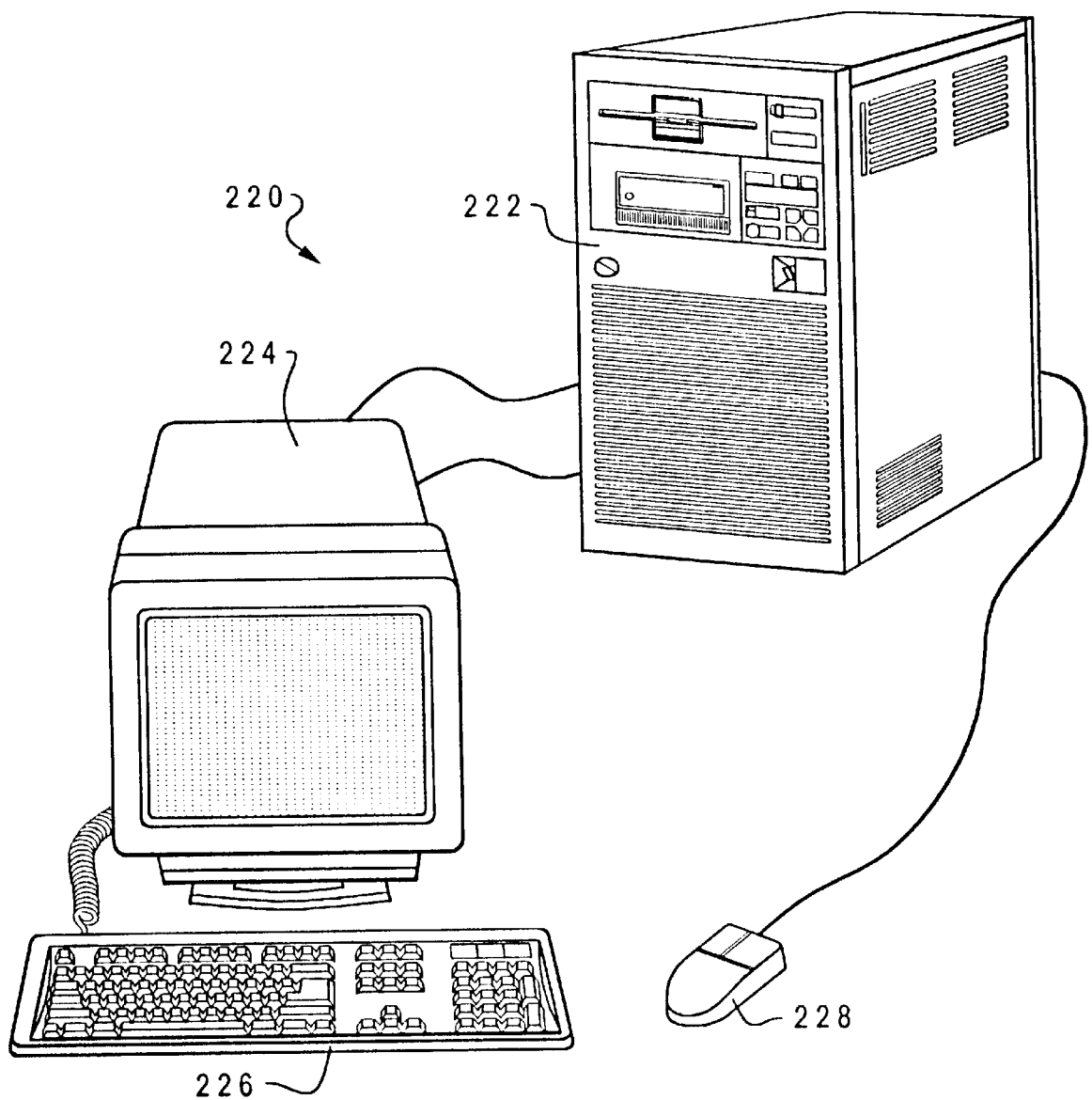
FIG. 7 depicts a pictorial representation of a data-processing system which can be utilized in accordance with the method and system of the present invention.

FIG. 7 depicts a pictorial representation of a data-processing system which can be utilized in accordance with the method and system of the present invention. The system and method provided by the present invention can be implemented with the data-processing system depicted in FIG. 7. A computer 220 is depicted which includes a system unit 222, a video display terminal 224, a keyboard 226, and a mouse 228. Computer 220 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 8:
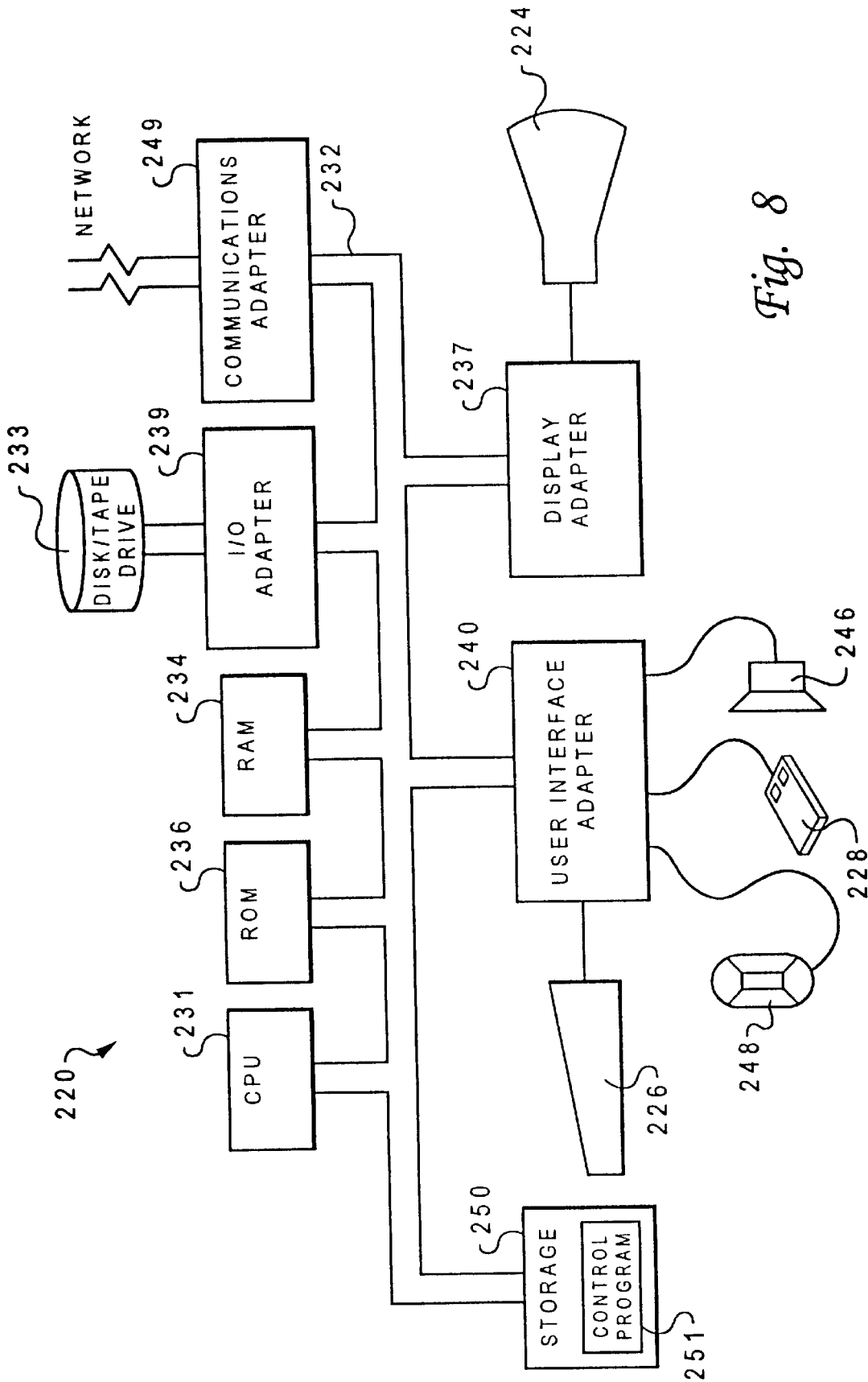
FIG. 8 is an illustration of a representative hardware environment which can be utilized in accordance with the method and system of the present invention.

FIG. 8 is an illustration of a representative hardware environment which can be utilized in accordance with the method and system of the present invention. FIG. 8 depicts selected components in computer 220 in which a preferred embodiment of the present invention may be implemented. System unit 222 includes a Central Processing Unit ("CPU") 231, such as a conventional microprocessor, and a number of other units interconnected via system bus 232. Computer 220 includes random-access memory ("RAM") 234, read-only memory ("ROM") 236, display adapter 237 for connecting system bus 232 to video display terminal 224, and I/O adapter 239 for connecting peripheral devices (e.g., disk and tape drives 233) to system bus 232. Video display terminal 224 is the visual output of computer 220, which can be a CRT-based video display well-known in the art of computer hardware. However, with a portable or notebook-based computer, video display terminal 224 can be replaced with an LCD-based or a gas plasma-based flat-panel display. Computer 220 further includes user interface adapter 240 for connecting keyboard 226, mouse 228, speaker 246, microphone 248, and/or other user interface devices, such as a touch screen device (not shown), to system bus 232. Communication adapter 249 connects computer 220 to a data-processing network.

Computer 220 also includes a graphical user interface that resides within a machine-readable media to direct the operation of computer 220. Any suitable machine-readable media may retain the graphical user interface, such as RAM 234, ROM 236, a magnetic diskette, magnetic tape, or optical disk (the last three being located in disk and tape drives 233). Any suitable operating system and associated graphical user interface (e.g., Microsoft Windows) may direct CPU 231. For example, the AIX operating system and AIXwindows windowing system (i.e., graphical user interface) can direct CPU 231. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 231, such as touch-screen technology or human voice control. In addition, computer 220 includes a control program 251 which resides within computer storage 250. Control program 251 contains instructions that when executed on CPU 231 carries out the operations depicted in the logic flow chart of FIGS. 5A, 5B and 5C described herein.

Those skilled in the art will appreciate that the hardware depicted in FIG. 8 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

In the example depicted in FIG. 8, the computer program product (i.e. control program 251) can reside in computer storage 250. However, it is important that while the present invention has been, and will continue to be, described in the context of a fully functional computing system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks, hard disk drives, CD ROMs, and transmission type media such as digital and analogue communication links.

The foregoing descriptions have referenced checking copies of files resident within private networks as to the ages of the files, the contents of the files, the locations of the copies of the files, etc. In an illustrative embodiment of the invention such file manipulation could be done via the use of distributed file systems, a few examples of which are NFS (Network Filesytem), DFS (Distributed Filesytem), and AFS (Andrews Filesystem).

While an illustrative embodiment has been particularly shown and described, it will be understood by those skilled in the art that various changes in form and detail may be made therein without departing from the spirit and scope of the illustrative embodiment.

What is claimed is:

1. An improved method for accessing a most recent version of a requested data file that has been downloaded into a private network from a source external to said private network, said method comprising the steps of:

establishing a network of computers as private relative to one or more other networks of computers;

specifying one or more computers within said defined private network as defining a common cache;

caching within said defined common cache a copy of a first data file entering said defined private network from a source external to said defined private network;

caching within said defined common cache a copy of a second data file entering said defined Private network from a source external to said defined private network, wherein said second data file is a most recent version of said first data file and has some content different from said first data file;

in response to a request from a computer within said defined private network for a specific data file which originates from a source external to said defined private network, determining that said requested specific data file corresponds to said first and second data files resident within said defined common cache; and in response to said determining step, obtaining a most recent version of said requested specific data file by transmitting the second data file which is resident within said defined common cache.

2. The method of claim 1, further comprising the step of:

in response to said determining step, obtaining said requested specific data file from a source external to said defined private network if said determining step indicates that a copy of said requested specific data file is not resident within said common cache.

3. The method of claim 1 wherein said step of establishing a network of computers as private relative to one or more other networks of computers further comprises the step of defining a network being served by a public Internet Host as private relative to the public Internet.

4. The method of claim 1 wherein said step of specifying one or more computers within said defined private network as defining a common cache further comprises the step of:

defining at least one network gateway server within said private network as said defined common cache.

5. The method of claim 1 wherein said step of caching a copy of a data file entering said defined private network from a source external to said defined private network within said defined common cache further comprises the steps of:

saving a copy of said data file at one or more computers making up said defined common cache.

6. The method of claim 1 wherein said step of caching within said defined common cache a copy of a data file entering said defined private network from a source external to said defined private network further comprises the steps of:

saving a copy of said data file at one or more computers making up said defined common cache;

directing that one or more computers making up said defined common cache query, on a scheduled or opportunistic basis, one or more other computers within said defined common cache as to a most recent version of said data file cached in said defined common cache; and in response to said querying, copying a most recent version of said data file cached in said defined common cache to said one or more computers making said queries.

7. The method of claim 1 wherein said step of caching a copy of a data file entering said defined private network from a source external to said defined private network within said defined common cache further comprises the steps of:

saving a copy of said data file at one or more computers making up said defined common cache;

directing that one or more computers making up said defined common cache query, on a scheduled or opportunistic basis, one or more other computers within said defined common cache as to a most recent version of said data file cached in said defined common cache; and in response to said querying, saving the location of a most recent version of said data file cached in said defined common cache.

8. The method of claim 1 wherein said step of determining if a copy of said requested specific data file is resident within said defined common cache further comprises the step of:

querying one or more computers within said defined common cache as to whether a copy of said requested specific data file is resident at said one or more computers.

9. The method of claim 1 wherein said step of obtaining a most recent version of said requested specific data file which is resident within said defined common cache further comprises the step of:

in response to said determining step, copying a most recent version of said requested data file to local memory.

10. The method of claim 1 wherein said step of obtaining a most recent version of said requested specific data file which is resident within said defined common cache further comprises the step of:

copying a most recent version of said requested data file to local memory; and delivering a most recent version of said requested data file to a computer requesting said most recent version.

11. The method of claim 1, further comprising the steps of copying received version of a most recent version of said requested data file to the local memory of a computer requesting said requested data file; and associating within the local memory of a computer requesting said specific data file a network address within said defined common cache where said copied most recent version was obtained with the name of said requested data file.

12. An improved system for accessing a most recent version of a requested data file that has been downloaded into a private network from a source external to said private network, said system comprising:

means for establishing a network of computers as private relative to one or more other networks of computers;

means for specifying one or more computers within said defined private network as defining a common cache;

means for caching within said defined common cache a copy of a first data file entering said defined private network from a source external to said defined private network, and a copy of a second data file entering said defined private network from a source external to said defined private network wherein said second data file is a most recent version of said first data file and has some content different from said first data file;

means, responsive to a request from a computer within said defined private network for a specific data file which originates from a source external to said defined private network, for determining that said requested specific data file corresponds to said first and second data files resident within said defined common cache; and means, responsive to said determining step, for obtaining a most recent version of said requested specific data file by transmitting the second data file which is resident within said defined common cache.

13. The system of claim 12, further comprising:

means, responsive to said determining step, for obtaining said requested specific data file from a source external to said defined private network if said means for determining indicates that a copy of said requested specific data file is not resident within said common cache.

14. The system of claim 12 wherein said means for establishing a network of computers as private relative to one or more other networks of computers further comprises means for defining a network being served by a public Internet Host as private relative to the public Internet.

15. The system of claim 12 wherein said means for specifying one or more computers within said defined private network as defining a common cache further comprises:

means for defining at least one network gateway server within said private network as said defined common cache.

16. The system of claim 12 wherein means for coaching a copy of a data file entering said defined private network from a source external to said defined private network within s aid defined common cache further comprises:

means for saving a copy of said data file at one or more computers making up said defined common cache.

17. The system of claim 12 wherein said means for caching within said defined common cache a copy of a data file entering said defined private network from a source external to said defined private network further comprises:

means for saving a copy of said data file at one or more computers making up said defined cache;

means for directing that one or more computers making up said defined common cache query, on a scheduled or opportunistic basis, one or more other computers within said defined common cache as to a most recent version of said data file cached in said defined common cache; and means, responsive to said querying, for copying a most recent version of said data file cached in said defined common cache to said one or more computers making said queries.

18. The system of claim 12 wherein said means for caching a copy of a data file entering said defined private network from a source external to said defined private network within said defined common cache further comprises:

means for saving a copy of said data file at one or more computers making up said defined common cache;

means for directing that one or more computers making up said defined common cache query, on a scheduled or opportunistic basis, one or more other computers within said defined common cache as to a most recent version of said data file cached in said defined common cache; and means, responsive to said querying, for saving the location of a most recent version of said data file cached in said defined common cache.

19. The system of claim 12 wherein said means for determining if a copy of said requested specific data file is resident within said defined common cache further comprises:

means for querying one or more computers within said defined common cache as to whether a copy of said requested specific data file is resident at said one or more computers.

20. The system of claim 12 wherein said means for obtaining a most recent version of said requested specific data file which is resident within said defined common cache further comprises:

means, responsive to said determining step, for copying a most recent version of said requested data file to local memory.

21. The system of claim 12 wherein said means for obtaining a most recent version of said requested specific data file which is resident within said defined common cache further comprises:

means for copying a most recent version of said requested data file to local memory; and means for delivering a most recent version of said requested data file to a computer requesting said most recent version.

22. The system of claim 12, further comprising:

means for copying received version of a most recent version of said requested data file to the local memory of a computer requesting said requested data file; and means for associating within the local memory of a computer requesting said specific data file a network address within said defined common cache where said copied most recent version was obtained with the name of said requested data file.

23. A program product for accessing a most recent version of a requested data file that has been downloaded into a private network from a source external to said private network, said program product comprising:

means for establishing a network of computers as private relative to one or more other networks of computers;

means for specifying one or more computers within said defined private network as defining a common cache;

means for caching within said defined common cache a copy of a first data file entering said defined private network from a source external to said defined private network, and a copy of a second data file entering said defined private network from a source external to said defined private network wherein said second data file is a most recent version of said first data file and has some content different from said first data file;

means, responsive to a request from a computer within said defined private network for a specific data file which originates from a source external to said defined private network, for determining that said requested specific data file corresponds to said first and second data files resident within said defined common cache;

means, responsive to said determining step, for obtaining a most recent version of said requested specific data file by transmitting the second data file which is resident within said defined common cache; and signal bearing media bearing said means for establishing, specifying, caching, determining, and obtaining.

24. The program product of claim 23 wherein said signal bearing media comprises recordable media.

25. The program product of claim 23 wherein said signal bearing media comprises transmission media.

26. The program product of claim 23, further comprising:

means, responsive to said determining step, for obtaining said requested specific data file from a source external to said defined private network if said means for determining indicates that a copy of said requested specific data file is not resident within said common cache.

27. The program product of claim 23 wherein said means for establishing a network of computers as private relative to one or more other networks of computers further comprises means for defining a network being served by a public Internet Host as private relative to the public Internet.

28. The program product of claim 23 wherein said means for specifying one or more computers within said defined private network as defining a common cache further comprises:

means for defining at least one network gateway server within said private network as said defined common cache.

29. The program product of claim 23 wherein means for caching a copy of a data file entering said defined private network from a source external to said defined private network within said defined common cache further comprises:

means for saving a copy of said data file at one or more computers making up said defined common cache.

30. The program product of claim 23 wherein said means for caching within said defined common cache a copy of a data file entering said defined private network from a source external to said defined private network further comprises:

means for saving a copy of said data file at one or more computers making up said defined common cache;

means for directing that one or more computers making up said defined common cache query, on a scheduled or opportunistic basis, one or more other computers within said defined common cache as to a most recent version of said data file cached in said defined common cache; and means, responsive to said querying, for copying a most recent version of said data file cached in said defined common cache to said one or more computers making said queries.

31. The program product of claim 23 wherein said means for caching a copy of a data file entering said defined private network from a source external to said defined private network within said defined common cache further comprises:

means for saving a copy of said data file at one or more computers making up said defined common cache;

means for directing that one or more computers making up said defined common cache query, on a scheduled or opportunistic basis, one or more other computers within said defined common cache as to a most recent version of said data file cached in said defined common cache; and means, responsive to said querying, for saving the location of a most recent version of said data file cached in said defined common cache.

32. The program product of claim 23 wherein said means for determining if a copy of said requested specific data file is resident within said defined common cache further comprises:

means for querying one or more computers within said defined common cache as to whether a copy of said requested specific data file is resident at said one or more computers.

33. The program product of claim 23, wherein said means for obtaining a most recent version of said requested specific data file which is resident within said defined common cache further comprises:

means, responsive to said determining step, for copying a most recent version of said requested data file to local memory.

34. The program product of claim 23 wherein said means for obtaining a most recent version of said requested specific data file which is resident within said defined common cache further comprises:

means for copying a most recent version of said requested data file to local memory; and means for delivering a most recent version of said requested data file to a computer requesting said most recent version.

35. The program product of claim 23, further comprising:

means for copying received version of a most recent version of said requested data file to the local memory of the computer requesting said requested data file; and means for associating within the local memory of a computer requesting said specific data file a network address within said defined common cache where said copied most recent version was obtained with the name of said requested data file.

* * * * *